US009429829B2

(12) United States Patent
Chiu et al.

(10) Patent No.: US 9,429,829 B2
(45) Date of Patent: Aug. 30, 2016

(54) ILLUMINATION SYSTEM AND PROJECTION APPARATUS

(71) Applicants: Hao-Wei Chiu, Hsin-Chu (TW); Chi-Hsun Wang, Hsin-Chu (TW); Ko-Shun Chen, Hsin-Chu (TW)

(72) Inventors: Hao-Wei Chiu, Hsin-Chu (TW); Chi-Hsun Wang, Hsin-Chu (TW); Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 67 days.

(21) Appl. No.: 14/483,167

(22) Filed: Sep. 11, 2014

(65) Prior Publication Data

US 2015/0138516 A1    May 21, 2015

(30) Foreign Application Priority Data

Nov. 21, 2013    (TW) .............................. 102142498 A

(51) Int. Cl.
*G02B 5/02* (2006.01)
*G03B 21/20* (2006.01)

(52) U.S. Cl.
CPC ........... *G03B 21/204* (2013.01); *G02B 5/0257* (2013.01); *G03B 21/208* (2013.01)

(58) Field of Classification Search
CPC .. G03B 21/204; G03B 21/20; G03B 21/206; G03B 21/208; G02B 5/0205; G02B 5/02; G02B 5/0257; F21Y 2101/025; F21Y 2101/00; F21Y 2101/02
USPC ................................................. 362/246, 355
See application file for complete search history.

(56) References Cited

U.S. PATENT DOCUMENTS

| 6,870,650 B2 | 3/2005 | Kappel et al. |
| 7,271,962 B2 | 9/2007 | Kasazumi et al. |
| 7,554,737 B2 | 6/2009 | Knox et al. |
| 8,109,638 B2 | 2/2012 | Chen et al. |
| 2007/0291484 A1 | 12/2007 | Chen et al. |
| 2008/0278689 A1* | 11/2008 | Read ................. H04N 13/0459 353/7 |

(Continued)

FOREIGN PATENT DOCUMENTS

| CN | 101405653 | 4/2009 |
| CN | 102147562 | 8/2011 |

(Continued)

OTHER PUBLICATIONS

"Office Action of Taiwan Counterpart Application", issued on Mar. 20, 2015, p. 1-p. 3.

(Continued)

*Primary Examiner* — William C Dowling
*Assistant Examiner* — Ryan Howard
(74) *Attorney, Agent, or Firm* — Jianq Chyun IP Office

(57) ABSTRACT

An illumination system including at least one laser light source, a wavelength conversion device, and a two-dimensional (2D) anisotropic diffusion sheet is provided. The laser light source emits a laser beam, and the wavelength conversion device is located on a transmission path of the laser beam. The 2D anisotropic diffusion sheet is located on the transmission path of the laser beam and between the laser light source and the wavelength conversion device. Besides, the 2D anisotropic diffusion sheet allows the laser beam to have an increasing degree of a divergent angle in a first direction greater than an increasing degree of a divergent angle in a second direction. The first direction is substantially parallel to a slow axis of the laser beam. A projection apparatus is also provided.

12 Claims, 3 Drawing Sheets

(56) References Cited

U.S. PATENT DOCUMENTS

| | | | | |
|---|---|---|---|---|
| 2009/0185141 A1* | 7/2009 | Chen | ................. | G02B 27/48 353/38 |
| 2009/0268168 A1* | 10/2009 | Wang | ................. | G02B 27/48 353/37 |
| 2015/0077714 A1* | 3/2015 | Hsieh | ................. | G03B 21/204 353/31 |

FOREIGN PATENT DOCUMENTS

| | | |
|---|---|---|
| CN | 102375315 | 3/2012 |
| CN | 102707553 | 10/2012 |
| CN | 102879988 | 1/2013 |
| CN | 103062672 | 4/2013 |
| JP | 2009258738 | 11/2009 |
| TW | I300834 | 9/2008 |
| TW | 201213858 | 4/2012 |
| TW | 201215987 | 4/2012 |
| TW | 201235618 | 9/2012 |

OTHER PUBLICATIONS

"Office Action of Taiwan Counterpart Application", issued on Dec. 25, 2015, p. 1-p. 7.

"Office Action of China Counterpart Application", issued on Nov. 24, 2015, p. 1-p. 9.

\* cited by examiner

ILLUMINATION SYSTEM AND PROJECTION APPARATUS

CROSS-REFERENCE TO RELATED APPLICATION

This application claims the priority benefit of Taiwan application serial no. 102142498, filed on Nov. 21, 2013. The entirety of the above-mentioned patent application is hereby incorporated by reference herein and made a part of this specification.

BACKGROUND

1. Field of the Disclosure

The invention relates to an optical system and a display apparatus and more particularly relates to an illumination system and a projection apparatus.

2. Description of Related Art

Recently, projection apparatuses featuring solid-state light sources such as light-emitting diode (LED) and laser diode have gradually become dominant in the market. The light-emitting efficiency of the laser diode is about 20% in comparison with the normal LED; in order to remove the limitation on the LED light source, phosphor has been excited by the laser light source, and thereby the pure color light source required by the projector is generated. In a laser projection apparatus, the laser light source not only excites the phosphor to emit light but also acts as the direct light source which provides illumination to the projector. Besides, the number of the light sources may be adjusted in response to the requirement for brightness, so as to comply with different demands of various projectors for brightness. Accordingly, the projector with a laser light source system has great potential to replace the conventional high-pressure mercury lamp and become the next-generation mainstream projector.

In a conventional laser projector, laser beams emitted by laser emitters arranged in an array are collected onto a phosphor layer to output sufficient fluorescent brightness. However, the light spot resulting from the semiconductor laser emitters is about elliptic-shaped, and the light intensity distribution of the laser beam is similar to Gaussian distribution. By contrast, after the laser beam excites the phosphor, the light spot of the resultant beam is about circular-shaped, and the light intensity distribution of the excited beam is similar to Lambertian distribution. When the laser beam and the beam obtained by exciting the phosphor are combined, different shapes of the light spots and different light intensity distributions result in uneven illumination, such that the color of the displayed image projected by the laser projector is not uniform.

The light spot generated by the laser beam with the light intensity distribution being similar to Gaussian distribution has strong light intensity at the central unit area, such that the conversion efficiency of the phosphor is saturated and difficult to be improved, and thus the brightness of the displayed image projected by the laser projector isn't further enhanced. Besides, the light spot with high light intensity burns the phosphor or reduces the service life of the phosphor.

Taiwan Patent Publication no. 201235618 discloses a light source apparatus with an excitation light source. U.S. Pat. No. 8,109,638 discloses a projector. U.S. Pat. No. 6,870,650 discloses that the diffusion angle of the laser beam is different in the horizontal direction and in the perpendicular direction after the laser beam passes through a diffusion sheet. U.S. Pat. No. 7,271,962 discloses an image formation apparatus.

SUMMARY OF THE DISCLOSURE

The invention is directed to an illumination system with even illumination, favorable light-emitting efficiency, and long lifespan.

The invention is directed to a projection apparatus with favorable image quality, satisfactory light-emitting efficiency, and long lifespan.

Additional aspects and/or advantages of the invention will be set forth in part in the description which follows and, in part, will be obvious from the description, or may be learned by practice of the invention.

To achieve one of, a part of or all of the above-mentioned objectives, or to achieve other objectives, an embodiment of the invention provides an illumination system including at least one laser light source, a wavelength conversion device, and a two-dimensional anisotropic diffusion sheet. The laser light source is capable of emitting a laser beam, and the wavelength conversion device is located on a transmission path of the laser beam. The two-dimensional anisotropic diffusion sheet is located on the transmission path of the laser beam and between the at least one laser light source and the wavelength conversion device. Besides, the two-dimensional anisotropic diffusion sheet allows the laser beam to have an increasing degree of a divergent angle in a first direction greater than an increasing degree of a divergent angle in a second direction. The first direction is substantially parallel to a slow axis of the laser beam.

An embodiment of the invention provides a projection apparatus including an illumination system, a light valve, and a projection lens. The illumination system includes at least one laser light source, a wavelength conversion device, and at least one two-dimensional anisotropic diffusion sheet. The laser light source is capable of emitting a laser beam. The two-dimensional anisotropic diffusion sheet is located on a transmission path of the laser beam and allows the laser beam to have an increasing degree of a divergent angle in a first direction greater than an increasing degree of a divergent angle in a second direction. Here, the first direction is substantially parallel to a slow axis of the laser beam. The wavelength conversion device is located on the transmission path of the laser beam from the two-dimensional anisotropic diffusion sheet. The wavelength conversion device includes at least one wavelength conversion region and at least one light transmission region. The wavelength conversion region and the light transmission region are adapted to move onto the transmission path of the laser beam by turns. When the light transmission region moves onto the transmission path of the laser beam, the laser beam passes through the wavelength conversion device. When the wavelength conversion region moves onto the transmission path of the laser beam, the laser beam is converted into at least one converted beam by the wavelength conversion region. The light valve is located on the transmission path of the laser beam and a transmission path of the converted beam, and the light valve is configured to convert the laser beam and the converted beam into an image beam. The projection lens is located on a transmission path of the image beam.

In view of the above, the wavelength conversion and filter module and the light source system described in the embodiments of the invention may have at least one of the following advantages. In the illumination system and the projection apparatus described in the embodiment of the invention, the two-dimensional anisotropic diffusion sheet allows the laser beam to have the greater increasing degree of the divergent angle in the slow-axis direction; thereby, the light spot on the wavelength conversion device is about circular-shaped, and the distribution of the light spot is similar to Lambertian distribution. Thereby, the illumination system is able to provide uniform illumination. Besides, the central light intensity of the light spot on the wavelength conversion device may not be over high to avoid causing the conversion efficiency of the wavelength conversion device to be saturated so as to difficult to be enhanced or avoid causing the wavelength conversion device to be burnt. Hence, the projection apparatus described in the embodiment of the invention may have favorable image quality, satisfactory light-emitting efficiency, and long lifespan.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
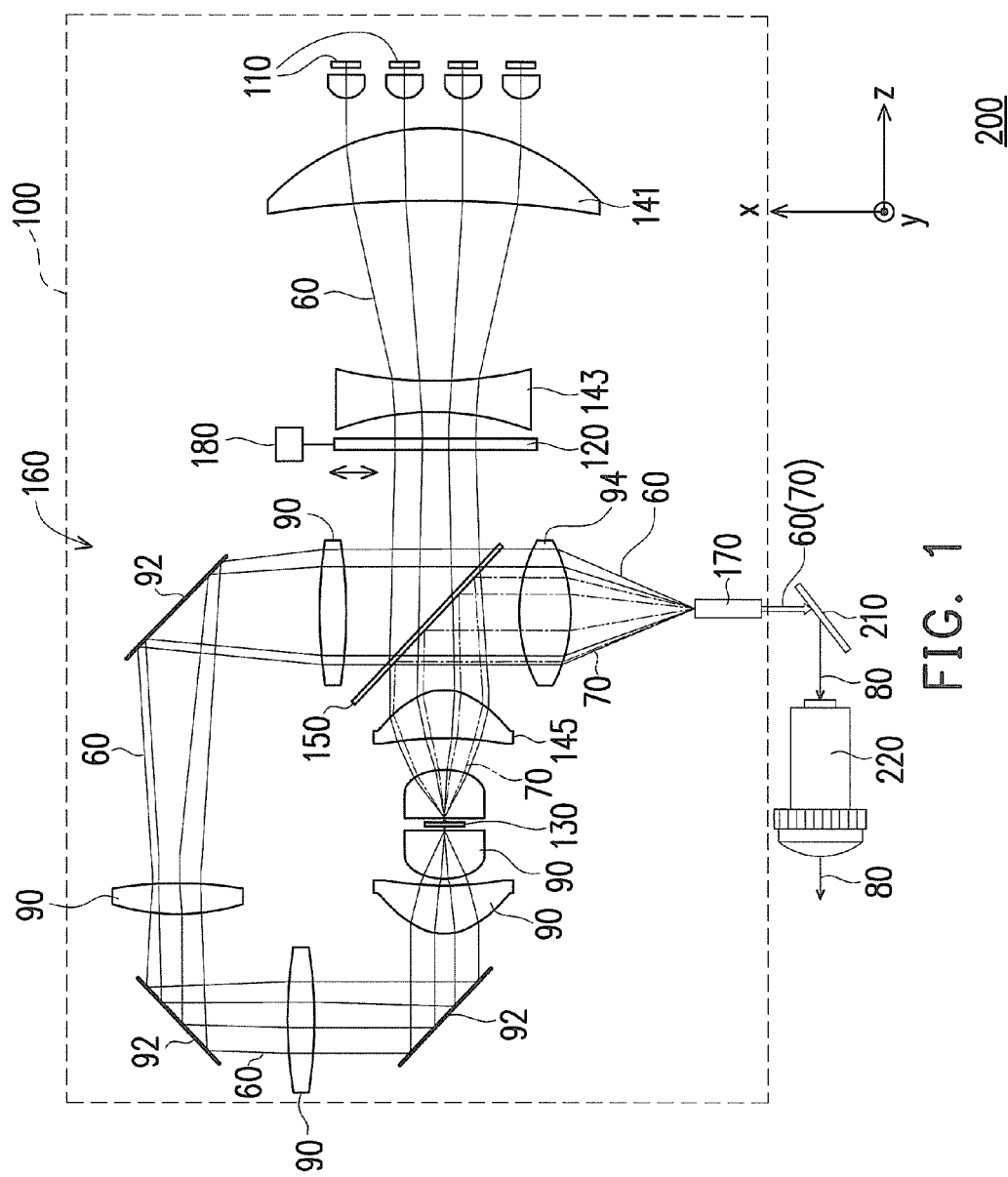
FIG. 1 is a schematic view illustrating a framework of a projection apparatus according to an embodiment of the invention.

With reference to FIG. 1, in the embodiment, the projection apparatus 200 includes an illumination system 100, a light valve 210, and a projection lens 220. In the embodiment, the light valve 210, for instance, is a digital micromirror device (DMD) or a liquid-crystal-on-silicon panel (LCOS panel). However, in other embodiments, the light valve 210 may be a transmissive liquid crystal panel or any other spatial light modulator.

Specifically, in the embodiment, the illumination system 100 includes at least one laser light source 110, a two-dimensional anisotropic diffusion sheet 120, and a wavelength conversion device 130. The laser light source 110 described in the embodiment is a semiconductor laser light source, e.g., a laser diode. For instance, the laser light source 110 may be a blue laser diode bank, the laser beam 60 is a blue laser beam, and the wavelength conversion device is a wavelength conversion wheel; however, the invention is not limited thereto. Besides, the wavelength conversion device 130 is located on a transmission path of the laser beam 60. The two-dimensional anisotropic diffusion sheet 120 is located on the transmission path of the laser beam 60, and located between the laser light source 110 and the wavelength conversion device 130. To be more specific, in the embodiment, the illumination system 100 further includes a plurality of lenses 141, 143, and 145 located between the laser light source 110 and the wavelength conversion device 130, and the two-dimensional anisotropic diffusion sheet 120 is located between the lens 143 and lens 145. The laser beam 60 may be transmitted to the wavelength conversion device 130 through the two-dimensional anisotropic diffusion sheet 120. In another embodiment, the two-dimensional anisotropic diffusion sheet 120 may also be located between the lens 141 and lens 143.

Furthermore, in the embodiment, the laser light source 110 emits the laser beam 60. Generally, when the laser beam leaves the laser light source 110 from the light-emitting surface of the laser light source 110, the divergent angle of the laser beam along a fast-axis (i.e., the long axis of the laser beam 60; the divergent angle of the laser beam 60 in the long-axis direction is greater) may be different from the divergent angle of the laser beam along a slow-axis (i.e., the short axis of the laser beam 60; the divergent angle of the laser beam 60 in the short-axis direction is smaller). Namely, the light beam emitted from the light-emitting surface of the laser light source 110 is shaped as an elliptic cone, and the two-dimensional anisotropic diffusion sheet 120 may allow the laser beam 60 to have an increasing degree of a divergent angle in a first direction (e.g., the x direction as shown in FIG. 1) greater than an increasing degree of a divergent angle in a second direction (e.g., the y direction as shown in FIG. 1). Here, the first direction (e.g., the x direction) is substantially parallel to a slow axis of the laser beam 60. That is to say, the diffusion capability of the two-dimensional anisotropic diffusion sheet 120 in the first direction (e.g., the x direction) is greater than that in the second direction (e.g., the y direction). Thereby, when the two-dimensional anisotropic diffusion sheet 120 does not be adopted, an elliptic light spot resulted from the laser beam 60 is formed on the wavelength conversion device 130; at this time, the short axis of the elliptic light spot is substantially parallel to the first direction (e.g., the x direction), and the long axis thereof is substantially parallel to the second direction (e.g., the y direction). However, when the two-dimensional anisotropic diffusion sheet 120 is in use, due to the greater increasing degree of the divergent angle of the laser beam 60 in the first direction (e.g., the x direction), the light spot on the wavelength conversion device 130 is nearly shaped in a circular manner. According to the embodiment, the first direction (e.g., the x direction) is substantially perpendicular to the second direction (e.g., the y direction), and the z direction is perpendicular to the x direction and the y direction. Here, the z direction is, for example, the normal direction of the two-dimensional anisotropic diffusion sheet 120. Besides, the fast axis of the laser beam 60 described in the embodiment is substantially parallel to the second direction (e.g., the y direction). In an embodiment, after the laser beam 60 passes through the two-dimensional anisotropic diffusion sheet 120, the divergent angle of the laser beam 60 in the first direction (e.g., the x direction) is similar to or substantially equal to the divergent angle of the laser beam 60 in the second direction (e.g., the y direction), and therefore the light spot nearly in circular shape may be formed by the laser beam 60.

Then, as shown in FIG. 1, in the embodiment, the illumination system 100 further includes a light combination unit 150 located between at least one laser light source 110 and the wavelength conversion device 130, and located on the transmission path of the laser beam 60 passing through the wavelength conversion device 130. Specifically, the light combination unit 150 is a dichroic mirror or a dichroic prism capable of achieving different optical effects on beams with different colors. For instance, in the embodiment, the light combination unit 150 allows, for example, the blue beam to pass through and to reflect beams with other colors (e.g., red, green, yellow, and so on). That is, the light combination unit 150 described in the embodiment may allow the laser beam 60 to pass through, such that the laser beam 60 may pass through the light combination unit 150 and enter the wavelength conversion device 130.

Figure 2:
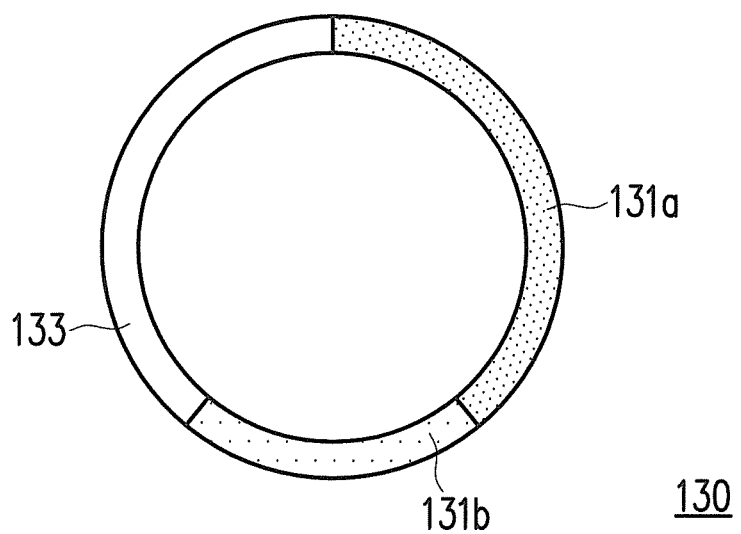
FIG. 2 is a schematic front view illustrating the wavelength conversion device 130 depicted in FIG. 1.

Referring to FIG. 2, the wavelength conversion device is a rotatable plate-shaped device. Besides, as shown in FIG. 1, the wavelength conversion device 130 is located on the transmission path of the laser beam 60, and the illumination system 100 further includes a light homogenizing device 170 located on the transmission path of the laser beam 60. To be more specific, as illustrated in FIG. 2, the wavelength conversion device 130 described in the embodiment also includes at least one wavelength conversion region 131*a* and 131*b* and at least one light transmission region 133. For instance, in the embodiment, each of the wavelength conversion regions 131*a* and 131*b* includes a phosphor region composed of a reflector and a phosphor layer (not shown) on the reflector, and the colors of the phosphor layers in the wavelength conversion regions 131*a* and 131*b* are different from the color of the laser beam 60. The colors of the phosphor layers in the wavelength conversion regions 131*a* and 131*b* may be, for example, red and green, respectively. The at least one wavelength conversion regions 131*a* and 131*b* and the at least one light transmission region 133 are adapted to move onto the transmission path of the laser beam 60 by turns.

When the at least one wavelength conversion regions 131*a* and 131*b* move onto the transmission path of the laser beam 60 by turns, the laser beam 60 is converted into at least one converted beam 70 in red or green by the at least one wavelength conversion region 131*a* and 131*b*, and the at least one converted beam 70 may be reflected by the wavelength conversion device 130. Otherwise, as shown in FIG. 1, the light combination unit 150 is located on the transmission path of the at least one converted beam 70, and thus the at least one converted beam 70 is transmitted to the light combination unit 150.

When the at least one light transmission region 133 moves onto the transmission path of the laser beam 60, the laser beam 60 passes through the wavelength conversion device 130, is transmitted to the light combination unit 150 through a light transmission module 160, and passes through the light combination unit 150 to be transmitted to the light homogenizing device 170. In the embodiment, the light transmission module 160 includes a plurality of lenses 90 and a reflection mirror 92 among the lenses 90, so as to turn the laser beam 60 passing through the wavelength conversion device 130 and transmit the laser beam 60 back to the light combination unit 150.

In addition, the color of the at least one converted beam 70 is different from the color of the laser beam 60 so as to be transmitted to the light combination unit 150 to be capable of being about to be reflected to the light homogenizing device 170. Thereby, when the at least one wavelength conversion regions 131*a* and 131*b* and the at least one light transmission region 133 move to the transmission path of the laser beam 60, the laser beam 60 irradiating the wavelength conversion device 130 may be sequentially converted to have different colors and may then be transmitted to the light homogenizing device 170.

In the embodiment, the light combination unit 150 is a dichroic unit, and the dichroic unit is located on the transmission path of the laser beam 60 from the laser light source 110. The dichroic unit transmits the laser beam 60 from the laser light source 110 to the wavelength conversion device 130, and the dichroic unit combines the at least one converted beam 70 and the laser beam 60 passing through the wavelength conversion device 130.

Note that the light combination unit 150 described herein is a dichroic mirror or a dichroic prism allowing the blue beam to pass through and reflect beams with other colors (e.g., red, green, and so on), whereas the invention is not limited thereto. In another embodiment, the light combination unit 150 may be a dichroic mirror or a dichroic prism allowing to reflect the blue beam and allowing beams with other colors (e.g., red, green, and so on) to pass through. People having ordinary skill in the art are able to have similar light combination effects accomplished by the light combination unit 150 following the association of the proper light path design and both the laser beam 60 and the converted beam 70 according to actual requirements, which will not be elaborated hereinafter.

In addition, as shown in FIG. 1, when the laser beam 60 and the converted beam 70 are transmitted to the light homogenizing device 170 through the illumination system 100, the light homogenizing device 170 may homogenize the laser beam 60 and the converted beam 70 in different colors and transmit these beams to the light valve 210. In the embodiment, the light homogenizing device 170 is, for instance, a light integration rod, and a condenser lens 94 condenses the converted beam 70 and the laser beam 60 from the light combination unit 150 at the entrance of the light integration rod. The light valve 210 is located on the transmission path of the laser beam 60 and the transmission path of the converted beam 70 to convert the laser beam 60 and the converted beam 70 into an image beam 80. The projection lens 220 is located on the transmission path of the image beam 80 to project the image beam 80 onto a screen (not shown) to form images. The light valve 210 would sequentially convert the converted beam 70 and the laser beam 60 in different colors into the image beam 80 in different colors and transmits the image beam 80 to the projection lens 220 after the converted beam 70 and the laser beam 60 in different colors are condensed on the light valve 210, hence the image beam 80 converted by the light valve 210 may be projected to form color images.

In the illumination system 100 described in the embodiment, the two-dimensional anisotropic diffusion sheet 120 allows the laser beam 60 to have the greater increasing degree of the divergent angle in the slow-axis direction; thereby, the light spot on the wavelength conversion device 130 is about circular-shaped, and the distribution of the light spot is similar to Lambertian distribution. Thereby, the illumination system 100 is able to provide uniform illumination. Besides, the central light intensity of the light spot on the wavelength conversion device 130 may not be over high to avoid causing the conversion efficiency of the wavelength conversion device 130 to be saturated so as to difficult to be enhanced or avoid resulting in the burnt wavelength conversion device 130. Hence, the projection apparatus 200 described herein may have favorable image quality, satisfactory light-emitting efficiency, and long lifespan. Moreover, the illumination system 100 described herein is able to achieve the effects mentioned above by one two-dimensional anisotropic diffusion sheet 120, and thus the illumination system 100 has the simple structure.

Besides, through the effect of the two-dimensional anisotropic diffusion sheet 120, the light spot generated by the laser beam 60 on the light homogenizing device 170 is about circular-shaped and the distribution of the light spot is similar to Lambertian distribution; similarly, the light spot generated by the converted beam 70 on the light homogenizing device 170 is also circular-shaped and the distribution of the light spot is also similar to Lambertian distribution. Therefore, the conditions of the laser beam 60 and the converted beam 70 entering the light homogenizing device 170 are similar to each other, and thus both the laser beam 60 and the converted beam 70 are able to provide uniform illumination to the light valve 210. Accordingly, the image generated by the projection apparatus 200 may have uniform color.

In the embodiment, the illumination system 100 further includes an actuator 180 connected to the two-dimensional anisotropic diffusion sheet 120 and configured to drive the two-dimensional anisotropic diffusion sheet 120 to move. Besides, in the embodiment, the actuator 180 drives the two-dimensional anisotropic diffusion sheet 120 to translationally vibrate, e.g., vibrate back and forth along the x direction. However, in other embodiments, the actuator 180 may drive the two-dimensional anisotropic diffusion sheet 120 to vibrate back and forth along the y direction or any other appropriate direction. The translationally vibrating two-dimensional anisotropic diffusion sheet 120 not only allows the light intensity distribution of the laser beam 60 to be more similar to the Lambertian distribution but also suppresses the speckle patterns generated on the screen by the laser beam 60. As such, the quality of the image frame may be improved. In another embodiment, the illumination system 100 may not include the actuator 180, and the two-dimensional anisotropic diffusion sheet 120 is a fixed optical film.

Figure 3A:
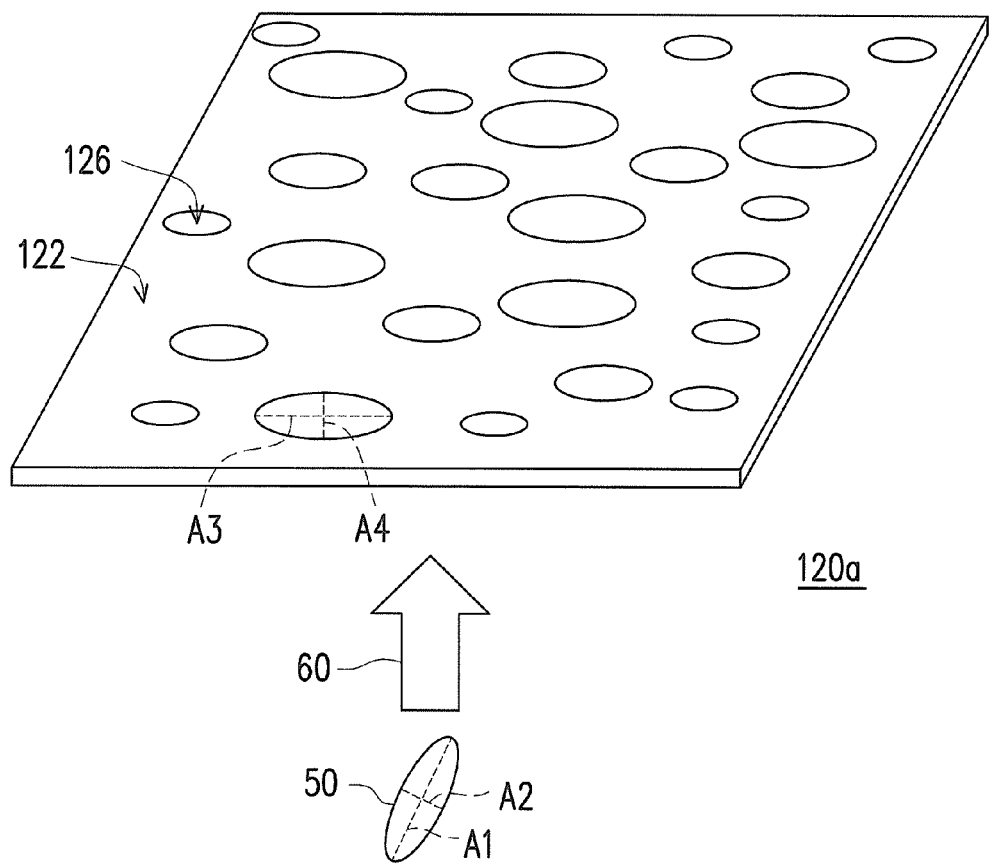
FIG. 3A is a schematic three-dimensional view illustrating the two-dimensional anisotropic diffusion sheet depicted in FIG. 1 according to an embodiment of the invention.
Figure 3B:
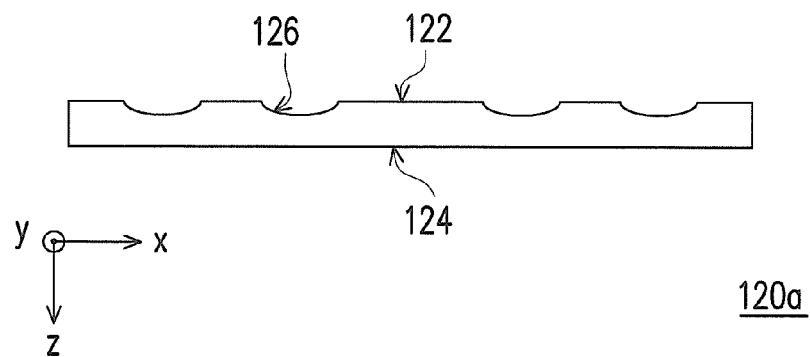
FIG. 3B is a schematic cross-sectional view illustrating the two-dimensional anisotropic diffusion sheet depicted in FIG. 3A.

With reference to FIG. 1, FIG. 3A, and FIG. 3B, the two-dimensional anisotropic diffusion sheet 120 depicted in FIG. 1 may be the two-dimensional anisotropic diffusion sheet 120a shown in FIG. 3A and FIG. 3B, which should however not be construed as a limitation to the invention. In the embodiment, the two-dimensional anisotropic diffusion sheet 120a has a first surface 122 and a second surface 124 opposite to the first surface 122. The first surface 122 is a light-emitting surface facing away from the laser light source 110, and the second surface 124 is a light incident surface facing the laser light source 110, for instance. At least one of the first and second surfaces 122 and 124 of the two-dimensional anisotropic diffusion sheet 120a (e.g., the first surface 122 in FIG. 3B) has a plurality of ellipsoid-shaped grooves 126. A long axis A3 of each of the ellipsoid-shaped grooves 126 is substantially orthogonal to the fast axis of the laser beam 60. FIG. 3A schematically illustrates the light spot 50 formed by the laser beam 60 irradiating the two-dimensional anisotropic diffusion sheet 120a. Here, the long axis A1 of the light spot 50 is parallel to the fast axis of the laser beam 60, and the short axis A2 of the light spot 50 is parallel to the slow axis of the laser beam 60. The long axis A1 is perpendicular to the short axis A2, and the long axis A1 is substantially perpendicular to the long axis A3 of each ellipsoid-shaped groove 126. Besides, the short axis A4 of the ellipsoid-shaped groove 126 is substantially perpendicular to the long axis A3 of the ellipsoid-shaped groove 126. In the embodiment, each ellipsoid-shaped groove 126 is, for instance, a semi-ellipsoid-shaped groove 126. However, in another embodiment, each ellipsoid-shaped groove 126 may also be a portion of a spheroid. The ellipsoid-shaped grooves 126 are distributed onto at least one of the first surface 122 and second surface 124 of the two-dimensional anisotropic diffusion sheet 120a according to the embodiment, for instance, distributed over at least one of the first surface 122 and second surface 124.

Since the long axis A3 of each of the ellipsoid-shaped grooves 126 is substantially orthogonal to the fast axis of the laser beam 60, i.e., the long axis A3 of each of the ellipsoid-shaped grooves 126 is substantially parallel to the slow axis of the laser beam 60, thus the two-dimensional anisotropic diffusion sheet 120a may allow the laser beam 60 to have the greater increasing degree of the divergent angle in the slow-axis direction.

To sum up, the illumination system and the projection apparatus described in the embodiments of the invention may have at least one of the following advantages. In the illumination system and the projection apparatus described in the embodiment of the invention, the two-dimensional anisotropic diffusion sheet allows the laser beam to have the greater increasing degree of the divergent angle in the slow-axis direction; thereby, the light spot on the wavelength conversion device is about circular-shaped, and the distribution of the light spot is similar to Lambertian distribution. Thereby, the illumination system is able to provide uniform illumination. Besides, the central light intensity of the light spot on the wavelength conversion device may not be over high to avoid causing the conversion efficiency of the wavelength conversion device to be saturated so as to difficult to be enhanced or avoid causing the wavelength conversion device to be burnt. Hence, the projection apparatus described in the embodiment of the invention may have favorable image quality, satisfactory light-emitting efficiency, and long lifespan.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. An illumination system, comprising:
   at least one laser light source capable of generating a laser beam;
   a wavelength conversion device located on a transmission path of the laser beam; and
   a two-dimensional anisotropic diffusion sheet, located on the transmission path of the laser beam, and located between the at least one laser light source and the wavelength conversion device, wherein the two-dimensional anisotropic diffusion sheet is configured for allowing the laser beam to have an increasing degree of a divergent angle in a first direction greater than an increasing degree of a divergent angle in a second direction, and wherein the first direction is substantially parallel to a slow axis of the laser beam, wherein a surface of the two-dimensional anisotropic diffusion sheet has a plurality of ellipsoid-shaped grooves, and a long axis of each of the ellipsoid-shaped grooves is substantially orthogonal to a fast axis of the laser beam.

2. The illumination system as claimed in claim 1, wherein the fast axis of the laser beam is substantially parallel to the second direction, and the first direction is substantially perpendicular to the second direction.

3. The illumination system as claimed in claim 1, wherein the wavelength conversion device comprises at least one wavelength conversion region and at least one light transmission region, the at least one wavelength conversion region and the at least one light transmission region are adapted to move onto the transmission path of the laser beam by turns, the laser beam passes through the wavelength conversion device when the at least one light transmission region moves onto the transmission path of the laser beam, the laser beam is converted into at least one converted beam by the at least one wavelength conversion region when the at least one wavelength conversion region moves onto the transmission path of the laser beam, and the illumination system further comprises:
   a light combination unit located between the at least one laser light source and the wavelength conversion device, and located on a transmission path of the at least one converted beam and the transmission path of the laser beam passing through the wavelength conversion device.

4. The illumination system as claimed in claim 3, wherein the light combination unit is a dichroic unit located on the transmission path of the laser beam from the at least one laser light source, the dichroic unit transmits the laser beam from the at least one laser light source to the wavelength conversion device, and the dichroic unit combines the at least one converted beam and the laser beam passing through the wavelength conversion device.

5. The illumination system as claimed in claim 4, further comprising a light transmission module configured for transmitting the laser beam passing through the wavelength conversion device back to the dichroic unit.

6. The illumination system as claimed in claim 1, further comprising an actuator connected to the two-dimensional anisotropic diffusion sheet and configured to drive the two-dimensional anisotropic diffusion sheet to move.

7. The illumination system as claimed in claim 6, wherein the actuator drives the two-dimensional anisotropic diffusion sheet to translationally vibrate.

8. A projection apparatus, comprising:
   an illumination system, comprising:
     at least one laser light source capable of generating a laser beam;
     at least one two-dimensional anisotropic diffusion sheet, located on a transmission path of the laser beam, configured for allowing the laser beam to have an increasing degree of a divergent angle in a first direction greater than an increasing degree of a divergent angle in a second direction, wherein the first direction is substantially parallel to a slow axis of the laser beam; and
     a wavelength conversion device located on the transmission path of the laser beam from the two-dimensional anisotropic diffusion sheet, the wavelength conversion device comprising at least one wavelength conversion region and at least one light transmission region, the at least one wavelength conversion region and the at least one light transmission region being adapted to move onto the transmission path of the laser beam by turns, wherein the laser beam passes through the wavelength conversion device when the at least one light transmission region moves onto the transmission path of the laser beam, and the laser beam is converted into at least one converted beam by the at least one wavelength conversion region when the at least one wavelength conversion region moves onto the transmission path of the laser beam, wherein a surface of the two-dimensional anisotropic diffusion sheet has a plurality of ellipsoid-shaped grooves, and a long axis of each of the ellipsoid-shaped grooves is substantially orthogonal to a fast axis of the laser beam;

a light valve located on the transmission path of the laser beam and a transmission path of the converted beam, and configured to convert the laser beam and the converted beam into an image beam; and a projection lens located on a transmission path of the image beam.

9. The projection apparatus as claimed in claim 8, wherein the fast axis of the laser beam is substantially parallel to the second direction, and the first direction is substantially perpendicular to the second direction.

10. The projection apparatus as claimed in claim 8, wherein the illumination system further comprises a light combination unit located between the at least one laser light source and the wavelength conversion device, and located on the transmission path of the at least one converted beam and the transmission path of the laser beam passing through the wavelength conversion device, so as to combine the at least one converted beam and the laser beam passing through the wavelength conversion device and transmit the combined beams to the light valve.

11. The projection apparatus as claimed in claim 10, wherein the light combination unit is a dichroic unit located on the transmission path of the laser beam from the at least one laser light source, the dichroic unit transmits the laser beam from the at least one laser light source to the wavelength conversion device, and the dichroic unit combines the at least one converted beam and the laser beam passing through the wavelength conversion device.

12. The projection apparatus as claimed in claim 11, wherein the illumination system further comprises a light transmission module configured for transmitting the laser beam passing through the wavelength conversion device back to the dichroic unit.

* * * * *